United States Patent [19]

Keyes et al.

[11] 4,393,402

[45] Jul. 12, 1983

[54] SUBTRACTION FLUOROSCOPY METHOD AND APPARATUS

[75] Inventors: Gary S. Keyes, Hartland; Jean-Pierre J. Georges, Waukesha; Dennis G. DallaPiazza, Oconomowoc, all of Wis.

[73] Assignee: General Electric Company, Schenectady, N.Y.

[21] Appl. No.: 271,314

[22] Filed: Jun. 8, 1981

[51] Int. Cl.³ .............................................. H04N 5/32
[52] U.S. Cl. ...................................... 358/111; 378/99
[58] Field of Search ............... 358/111, 105, 135, 136; 250/416 TV

[56] References Cited

U.S. PATENT DOCUMENTS

| | | | |
|---|---|---|---|
| 3,854,049 | 12/1974 | Mistretta et al. | 250/416 TV |
| 4,054,914 | 10/1977 | Fukuoka | 358/140 |
| 4,204,226 | 5/1980 | Mistretta et al. | 358/111 |
| 4,239,971 | 12/1980 | Cushman | 250/416 TV |
| 4,272,787 | 6/1981 | Michael et al. | 358/105 |
| 4,281,354 | 7/1981 | Conte | 358/105 |

Primary Examiner—Joseph A. Orsino, Jr.
Attorney, Agent, or Firm—Wheeler, House, Fuller & Hohenfeldt

[57] ABSTRACT

Image frames produced consecutively with x-ray beams having different spectral bands or average energy levels are converted to analog video signals and then to digital data. The digital data for an image at one energy is stored in a memory and the ensuing data for the next image is subtracted from the stored data in an alternate or cyclic fashion. The resulting difference data is converted to analog video signals and displayed on a television monitor at standard frame rates. The same system can be used to store a digitized data mask frame and the digital data for ensuing frames can be subtracted from the mask. In some embodiments a buffer is used to allow removal of data from memory without having the data from a preceding frame overwritten by ensuing frames. Other embodiments use more than one memory and, in some cases, buffers to allow manipulating the data so snapshot, integrated and continuous or real-time subtraction images can be displayed individually on a single monitor or jointly on additional monitors.

8 Claims, 11 Drawing Figures

SUBTRACTION FLUOROSCOPY METHOD AND APPARATUS

BACKGROUND OF THE INVENTION

The method and apparatus disclosed herein is for producing digitally subtracted real-time or continuous images, serial images and integrated images for video recording and display to enable dynamic non-invasive x-ray studies of rapidly moving organs such as the heart and, in particular, the blood vessels of such organs. The aforesaid technique is frequently referred to as digital subtraction fluoroscopy or radiography.

Prior examples of apparatus for performing real-time digital subtraction fluoroscopy are disclosed in U.S. Pat. Nos. 4,204,225 and 4,204,226, both issued on May 20, 1980.

One object of digital subtraction fluoroscopy is to obtain a visible representation of an x-ray image in which the anatomy of interest, usually the blood vessels, is emphasized and the anatomy which simply contributes to background and obscures the vessels is deemphasized. This object is achieved in the cited patents by converting successive x-ray images obtained with constant x-ray spectra to optical images, converting the optical images to analog video signals with a television camera, converting the analog signals to digital words which compose a frame and represent the individual picture elements comprising the images, storing the data for an image field or frame and then subtracting the data for the current frame from the preceding and/or succeeding frame alternately and repeatedly to yield data for displaying the results of subtraction as a succession of subtracted images on a television screen. The data for one or both or even more images in succession are usually weighted or variously operated on to bring about cancellation of obscuring background and to have the anatomy of interest remain.

An x-ray opaque dye, such as an iodine compound in solution, is usually injected intravenously remotely from the heart to aid in delineating the blood vessels when the dye reaches the heart and to afford an opportunity for determining how well the dyed blood circulates through the vessels.

Since the heart is in motion, registration of successive images which are subject to subtraction becomes problematical and some blurring of the displayed image results. The problem can be more difficult to deal with where, as in the prior patents, each x-ray view is made with the x-ray tube operating at the same anode-to-cathode voltage in which case the energy spectrum of the x-ray beam is fixed. This results in the intensities of the successive images being substantially the same, except for such differences as may result from the dye-carrying blood advancing further from view to view.

In prior art methods, several successive frames are integrated to reduce the effects of x-ray statistical noise and electronic system noise. The heart can move during the integrating interval and blurring is more likely to be noticeable in the displayed image. Moreover, if time must always be allowed for integrating, continuous and truly real-time images cannot be obtained. At best, perhaps fifteen subtracted frames per second could be displayed which is well below the thirty or sixty frames per second which should be obtainable in a 60 Hz synchronized television system.

In the successively integrated or time interval differencing mode of operation described in the prior patents, the maximum contrast obtainable in an image is that due to the difference in contrast between successive images and, as has been indicated, this mode only images what is changing between successive TV fields or frames. The change may be due to motion of the heart, for example, superimposed on a background consisting of unmoving tissue or bone in which case the moving organ must necessarily be a little blurred because of the time lapse between successive frames. In cases where an x-ray opaque contrast medium is being observed as it flows through the blood vessels, the only contrast difference which occurs between frames is that which is due to the leading edge of the opaque medium having advanced during the integrating interval between frames.

SUMMARY OF THE INVENTION

One object of the present invention is to provide a system that enables display of subtracted images of a moving organ, such as the heart, and the blood vessels therein in a continuous or real-time mode and in serial and integrated image modes. A further object is to obtain subtracted images having greater contrast than has been obtainable heretofore.

In accordance with the invention, these and other more specific objects are achieved by producing the images for subtraction by using the x-ray source that projects through the body x-ray beams that have different average energy levels and, thus, are differentially attenuated. In other words, for producing one of the x-ray beams, a particular high voltage is applied between the anode and cathode of the x-ray tube and a beam having a spectral distribution results but it has high average energy. For producing the other x-ray beam, a lower voltage is applied to the x-ray tube and a beam having a spectral distribution results and it has a lower average energy than in the preceding case. For the sake of convenience and brevity the x-ray beam having the higher average energy will be called the high energy beam in this disclosure and in the claims and the x-ray beam having the lower average energy will be called the low energy beam. The high and low energy beams always occur in close succession, such as within the same 1/30th or 1/60th of a second interval so that substantially no motion occurs between x-ray pulses. The x-ray images are converted to optical images and viewed with a video or television camera that converts them to the usual train of analog video signals. The analog signals corresponding to the low and high energy x-ray images are converted to digital data. The digital video data for a frame at one energy are acquired and stored in a full frame refresh memory. The digital data for the frame at the next energy level are then fed into an arithmetic processor in phase with the data that are being taken out of a memory so that the processor may subtract the data for the lower energy image from the data for the high energy image, or vice versa, and yield data representative of the difference between the images. Before subtraction, the data are selectively weighted in the processor. The digital data input from the processor are used as an address to a look-up table which facilitates introducing offset or level setting and expansion to fill the dynamic range of a digital-to-analog converter to which the subtracted and expanded data are input. The digital-to-analog converter yields analog signals which are then used to display the subtraction image on a television monitor.

The various embodiments of the invention provide the capability for displaying continuous or real-time images of objects in motion to permit visualization of the dynamics of an organ. Means are also provided for presenting images in a serial mode wherein the equivalent of a series of snapshots is obtained. Typically, the interval between snapshots is one second. Two successive video frames at the two different x-ray energy levels are subtracted to form each snapshot in order to minimize blurring due to motion. In some embodiments a capability for integrating subtracted images is provided.

How the foregoing and other more specific objects of the invention are achieved will be evident in the more detailed description of illustrative embodiments of the invention which will now be set forth in reference to the drawings.

DESCRIPTION OF A PREFERRED EMBODIMENT

Figure 1:
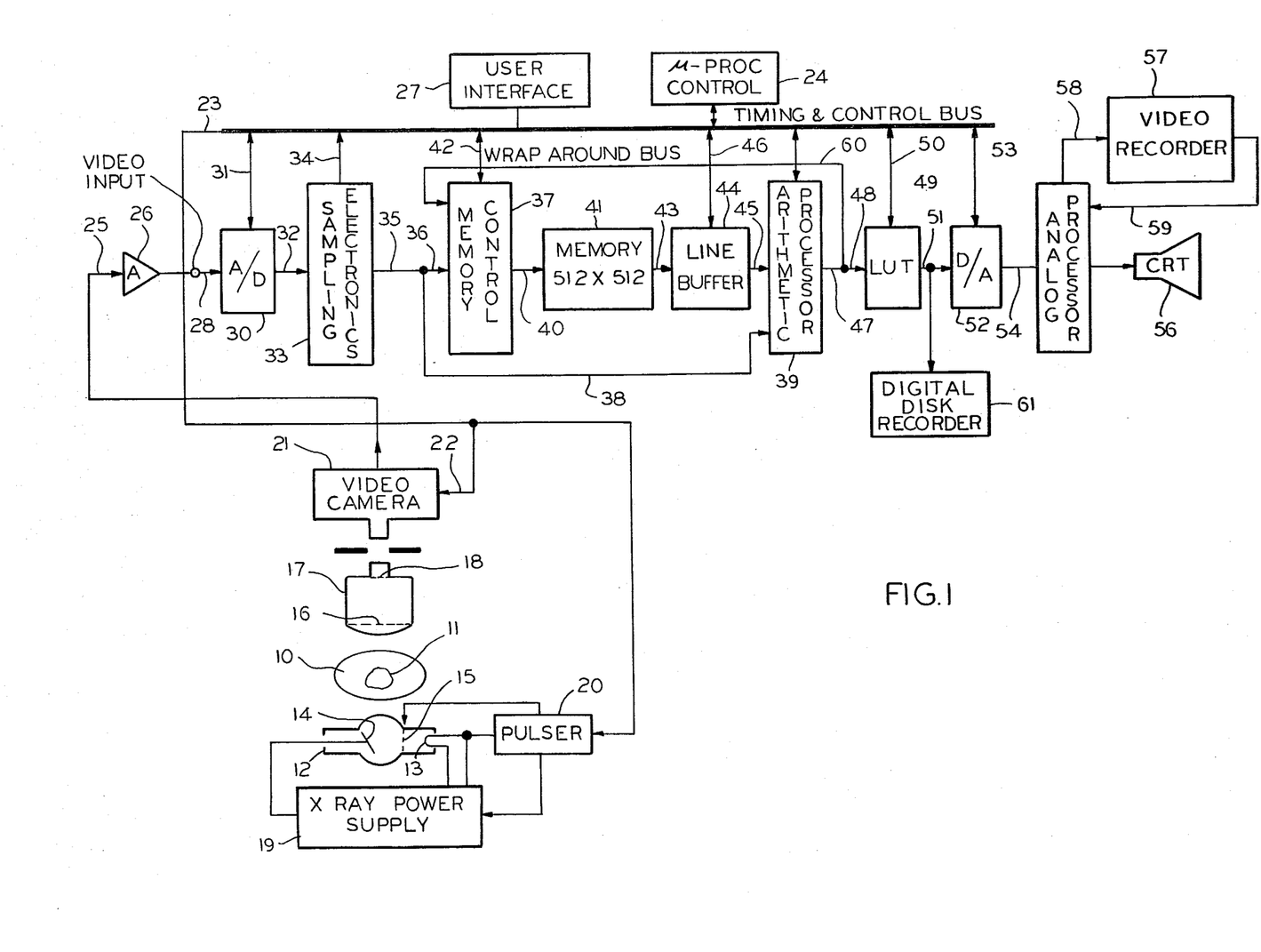
FIG. 1 is a block diagram of a system for obtaining x-ray images at dual x-ray energy levels in conjunction with one embodiment of the new signal processing and display system for providing video signals representative of the results of subtracting data corresponding to the images, said system using one memory and one line buffer and being capable of displaying continuous images and a series of snapshot images.

A typical x-ray system for use with the image subtraction system is shown in FIG. 1 in conjunction with subtraction and display systems. A body being subjected to examination is symbolized by an ellipse marked 10. The heart is marked 11. The body would normally be supported on an x-ray transmissive table top, not shown. An x-ray tube 12 is located below the body. It has a filament or cathode 13 and an anode 14 on which the electron beam from the cathode is focused to produce an x-ray beam. The illustrated x-ray tube has a control grid 15. When the x-ray tube is energized, its beam is projected through body 10 to form a differentially attenuated x-ray image on the input screen or photocathode 16 of an x-ray image intensifier device 17. The intensifier is conventional in that it converts the x-ray image to an electron image which is ultimately converted to a bright minified optical image that appears on the output phosphor which is represented by the dashed line marked 18. The x-ray tube power supply is represented by the block marked 19. It is understood to provide high kilovoltage between anode 14 and cathode 13 for making an x-ray exposure. In this case it is to be understood that the x-ray power supply 19 is capable of providing a low peak kilovoltage (kVp) and correspondingly low photon energy short duration pulses alternated with higher kVp and correspondingly higher photon energy pulses. By way of example and not limitation, for the subtraction system described herein, typical pulse durations most commonly lie in the range of about 1 to 10 ms. For the purposes of the invention and to minimize loss of registration between subtraction images due to anatomical motion during an imaging sequence, the low and high energy x-ray beam pulses in a pair follow each other very closely, typically within 1/30th of a second. A long sequence of high and low energy beam pairs may be used for real-time or continuous imaging such as is employed when a moving organ is being viewed. The low energy beams may precede the high energy beams or vice versa.

The control for causing the x-ray tube to emit low and high energy beam pulses is represented by the block marked 20 which is further identified as a pulser. A suitable pulser circuit is described in the co-pending application of Daniels, et al, Ser. No. 208,095, filed Nov. 18, 1980. The application is assigned to the assignee of the present application.

For the purposes of the subtraction method described herein, the low energy x-ray pulses typically have a photon energy spectrum corresponding to about 70 kVp being applied between the anode and cathode of the x-ray tube and the high energy pulses have an energy spectrum corresponding to about 140 kVp being applied. The pulser in the cited co-pending application modulated the x-ray tube voltage and current by applying different bias voltages to the grid 15 of the x-ray tube. A control which switches the high voltage circuit between low and high levels could also be used.

In FIG. 1, a single television or video camera 21 is used to view the succession of optical images produced by high and low energy x-ray beams and appearing on output phosphor 18 of the image intensifier. Synchronizing signals for controlling the video camera to scan or read out successive frames related to high energy and lower energy x-ray exposures are derived by way of line 22 from a control and timing signal bus 23 which for simplicity is represented as a single bus. A microprocessor 24 decodes commands to configure the system in the various embodiments and controls the sequence of operation. System timing is provided by a synchronization generator, not shown, that is contained in the sampling electronics module 33 which will be referred to again subsequently. Various operating modes of the embodiments are selected by the operator using the user interface 27 which may have a keyboard, not shown, and is coupled to the microprocessor by way of bus 23.

Video camera 21 outputs on line 25 the analog video signals corresponding to the sequence of television frames or fields obtained at alternately high and low x-ray energies. The high and low energy x-ray beams will be attenuated by markedly different amounts by the body so that there will be a larger difference between the magnitudes of the analog signals resulting from subtracting images at two different energies than there would be if the prior art practice of pulsing the x-ray source at constant kilovoltage energy levels for alternate frames were followed. As indicated earlier, if all x-ray exposures are at the same spectral band or average energy level, the main contrast difference between them will only be due to that which is caused by motion of the organ or by an x-ray opaque fluid advancing through the vessels of the organ during the time between frames.

Insofar as the subtraction system herein described is concerned, the video camera may be operated in the progressive or in the interlaced scan mode.

An arrangement for obtaining x-ray images in high and low energy sequences using two synchronously shuttered video cameras is described in co-pending application Ser. No. 229,249, filed Jan. 28, 1981 which application is assigned to the assignee of the present application and is now U.S. Pat. No. 4,355,518. The system described in the cited application could be used to provide the low and high energy x-ray attenuation data provided herein with a single video camera.

The analog video signal output from camera 21 is input to an amplifier 26. Since, as will be elucidated later, it is necessary to amplify or operate on the signals corresponding to x-ray intensities logarithmically before subtraction somewhere in the system, it is convenient to use an analog logarithmic amplifier where amplifier 26 is located. Of course, the video signals may be amplified logarithmically after they are converted to digital data.

The analog signals corresponding to the alternate high and low energy x-ray images which are output from amplifier 26 are input to an analog-to-digital (A/D) converter represented by the block marked 30. It is addressed synchronously with field-by-field or frame-by-frame video camera readout under control of the previously mentioned sync generator in sampling electronics module 33 to whose bus 23 it is coupled by way of a bus 31. If, as in the last cited co-pending application two video cameras were used, one for each x-ray energy level, there would be two input lines such as line 28 to A/D converter 30 or an additional A/D converter, not shown, could be used and switched synchronously.

The analog signals which are digitized by converter 30 appear on the output bus 32 of the converter. The analog signal amplitudes are converted to 8-bit digital words typically. The magnitude of each word corresponds to the intensity of the picture elements (pixels) at the point where the sample was taken along the analog video signal waveform. There is a series of pixel signals for each horizontal scan line of the camera whether the camera is operated in the progressive or interlaced scan mode. The output 32 from converter 30 is input to the sampling electronics which are symbolized by the block marked 33. The sampling electronics 33 are addressed and synchronized by signals on control bus 23 as indicated by the sampling electronics being coupled to the control bus by means of a bus 34. The sampling electronics are conventional and are operative to select the incoming digital pixel signal in proper sequence. The digital output of sampling electronics block 33 is to a bus 35 which branches in two different ways, one of which leads by way of a bus 36 to a memory control unit 37 and the other of which leads by way of a bus 38 directly to an arithmetic processor symbolized by the block marked 39. Memory control 37 is conventional and is coupled by means of a bus 40 to a refresh or full frame memory symbolized by the block marked 41. The capacity of memory 41 must be at least great enough to accommodate the data for two television fields or one frame. A 512×512 pixel memory of 8-bit depth per location has been found to be satisfactory. Of course, if the digital words, after conversion, were comprised of more bits it would be logical to use a memory 41 which has a corresponding bit depth. Thus, the memory will store 512 horizontal lines in each of which there are 512 digitized pixel signals.

Memory control 37 also receives synchronizing and address signals by way of a bus 42 which is coupled to the timing and control bus 23. Memory control 37 is operative to address the digital data corresponding to one energy level to the memory 41 for one frame and then cause the digital data for the other energy frame to be addressed to the arithmetic processor 39 by way of bus 38. The memory control causes the data for alternate low and high energy frames to be directed alternately to the memory and directly to the arithmetic processor. The memory output bus 43 provides input to a one-line buffer 44 which outputs by way of bus 45 to arithmetic processor 39. Buffer 44 holds one line comprised of 512 digitized pixel signals which corresponds to one television line. Thus, the data in the memory can be transferred on a line-by-line basis to the buffer. The arrangement makes it possible to put the pixel signals for each line of a television frame at one energy in phase with the live video digitized pixel signals for the corresponding line of the next frame at the other energy for proper timing in connection with subtraction. Assume for the sake of simplicity that progressive scanning is used by the video camera. Assume that the first X-ray beam pulse in a sequence is the high energy beam pulse. The digital data for the image resulting from this pulse is put into full frame memory 41. Next a low energy pulse occurs and its digital data is directed over bus 38 to arithmetic processor 39. The live video which is transferred by way of bus 38 is also fed into memory 41 as it is produced. Of course, the data stored in memory 41 for the previous high energy frame cannot be lost until it is used for subtraction. Thus, when memory 41 is filled with the data for a frame and during video camera retrace time, the first or top horizontal line of data in the memory is transferred for momentary storage in one-line buffer 44. This clears the top line of the memory for receiving the first or top line of data for the next line of pixel data related to the low energy frame. After the retrace interval has expired, the first line of data for the ensuing low energy frame or live video, will be on bus 38 and the first line of the preceding frame will be transferred out of the buffer with its pixel signals in phase with those of the live video signal on bus 38. When the second live video line occurs on bus 38, the next line from the preceding frame in the memory will be transferred from the buffer to the arithmetic processor. Thus, the data from the memory and the live video data are concurrent input on a line-by-line basis to the arithmetic processor so that corresponding pixels can be subtracted. To continue with the example, after the second or low energy frame has been completed, its data will now be stored in memory 41. Then when the next high energy frame is developed, it becomes a live video signal on bus 38 and is similarly subtracted on a line-by-line basis from the data in the memory. The alternate subtraction method is done in such a way that the subtracted signals output from the processor 39 always have the same polarity.

Those skilled in the art will appreciate that if the video camera 21 is operated in the interlaced field mode as opposed to the progressive scan mode, the data for the first field would be addressed successively to lines 1, 3, 5 and so on in memory 41 and the second field data would be addressed to lines 2, 4, 6 and so on. Nevertheless, during the retrace time, once the two fields are completed and the memory is full, the first line can be transferred from the memory to the buffer 45 to avoid loss of data for a previous frame as has been explained.

A more detailed description of the arithmetic processor 39 will be given later. For the present it is sufficient to be aware that the digital data for each frame is weighted before subtraction occurs in the processor. The difference image signals that result from pixel-by-pixel subtraction are output on a bus 47 and are input on a bus 48 to a look-up table (LUT) represented by the block marked 49. This look-up table will also be discussed in greater detail later. It too is coupled to timing and control bus 23 for receiving addressing and synchronizing signals by way of a bus 50. The digital difference data, suitably modified in LUT 49 as will be explained, is input by way of a bus 51 to a digital-to-analog (D/A) converter represented by the block marked 52. This converter is also coupled to the control bus by means of a bus 53. The D/A converter 52 converts the digital difference signals output from the LUT to analog video signals which are input by way of a bus 54 to an analog signal processor 55. The processor includes conventional circuits for effecting display of the subtracted image on a cathode ray tube 56 which is part of a conventional television monitor. The processor also can simultaneously provide the analog signals to a video recorder which is represented by the block marked 57. The analog signals are fed to the recorder 57 for being recorded by way of a line 58 and can be fed back to the processor by way of a cable 59 so that image data obtained in the past can be displayed at any time on the CRT. The video data may also be recorded in digital form with a disk recorder 61 that is fed from the output of the LUT 49.

It will be evident that if, as is true in the present case, data for an image at one x-ray energy is provided to memory 41 every 1/30th of a second and data for the image at the other x-ray energy is provided over bus 38 every 1/30th of a second and the two sets of data are subtracted on a pixel-by-pixel basis every 1/30th of a second, data for presenting the difference images is available every 1/30th of a second. Thus, the frame presentation rate on the screen of cathode ray tube 56 will be 30 frames per second in which case the image is effectively displayed in real-time. Hence, a moving organ, such as the heart, or the flow of slightly iodinated blood in the vessels of the heart or other organ can be observed continuously on the television screen.

The system in FIG. 1 also has a wrap around bus 60 which is for feeding the digital subtraction image data output from the arithmetic processor back to the memory when the system is operated in the serial imaging mode. Before discussing this mode, the arithmetic processor 39 and LUT 49 will be discussed in greater detail in reference to FIG. 8.

Figure 8:
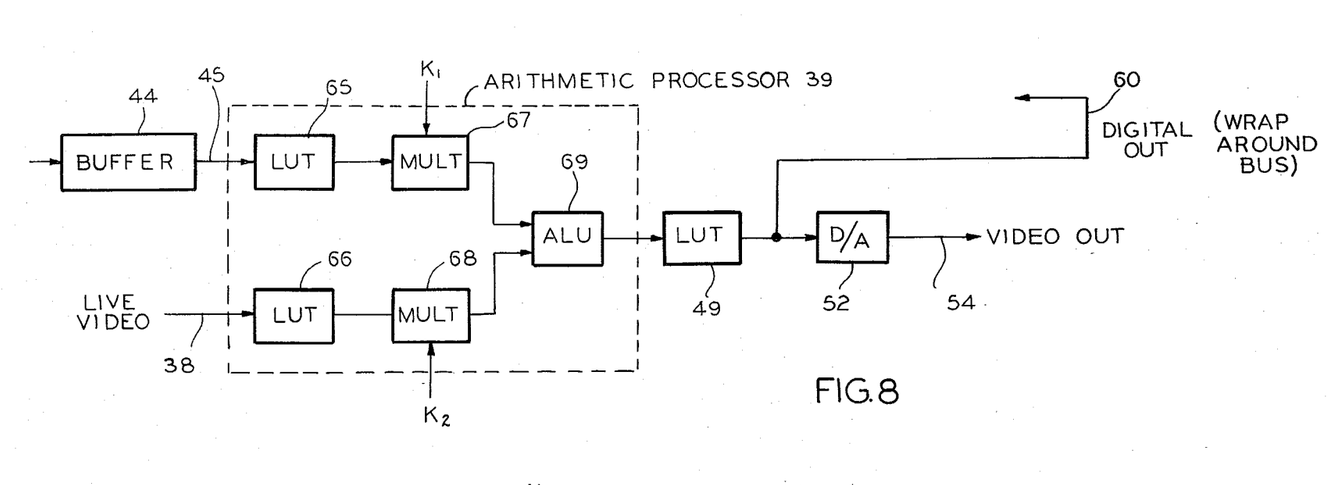
FIG. 8 includes a block diagram of a typical arithmetic processor for use in the FIG. 1 embodiment to obtain serial or continuous subtraction images.

In FIG. 8, the arithmetic processor 39 is encompassed within a dashed line rectangle. The output bus 45 from the one-line buffer 44 of FIG. 1 is given the same numeral 45 in FIG. 8. Similarly, the bus 38 for the live digitized video signals is given the same reference number 38. The processor has two look-up tables represented by the blocks marked 65 and 66. As indicated earlier, in order to maintain linearity and a signal that is proportional to the thickness of the opacifying material and is independent of the amount of overlying and underlying tissue it is necessary that the subtraction be performed on logarithmic data representative of the low and high energy x-ray images. Analog amplifier 26 could perform the logarithmic amplification.

The logarithmic amplification could also be accomplished after digitization by loading LUTs 65 and 66 with a suitable logarithmic transformation function. In this case, analog amplifier 25 is a linear amplifier. A pair of digital multipliers 67 and 68 are also provided. These multipliers have additional inputs marked $K_1$ and $K_2$, respectively, for introducing selected constant factors for modifying or weighting the digital signals as required. Thus, subtracted images are not produced by simple subtraction, but by weighted linear combination of images from two energies, that is, $K_1I_1-K_2I_2$. Usually K will be a factor other than 1. If it is 1, the image data, I, are still considered to be weighted in the context of this description. In the FIG. 8 processor, weighted data representative of high and low or low and high energy x-ray images are subtracted in an arithmetic logic unit (ALU) 69. Output from ALU 69 is input to LUT 49 which is shown in FIG. 1 but only mentioned up to this point. LUT 49 contains a look-up table for amplifying and offsetting the subtracted image signals to take advantage of the full dynamic range of the digital-to-analog converter 52 and to allow for negative values in the difference image. This permits displaying the subtracted image with a larger gray scale range on the CRT 56 display screen.

Figure 6:
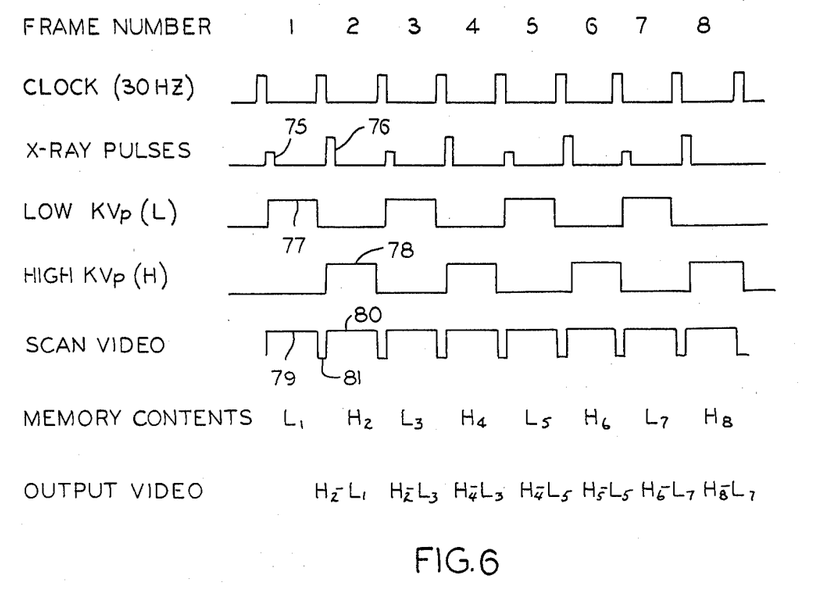
FIG. 6 is a timing diagram for illustrating the continuous imaging mode in a system such as the FIG. 1 embodiment.

The timing diagrams corresponding to operating the FIG. 1 embodiment in the continuous or real-time imaging mode are depicted in FIG. 6. The top line in the diagram indicates the frame number which is under consideration. The sync generator in sampling electronics 33 supplies the 30 Hz clock pulses in the second from the top line. An x-ray pulse occurs after each clock pulse. The x-ray pulses have alternating low and high energy or, vice-versa. A typical low energy x-ray pulse such as the one marked 75 would occur after one clock pulse and a high energy x-ray pulse would occur after the next clock pulse. The time intervals during which the low and high energy x-ray pulses are permitted are indicated, respectively, by the intervals marked 77 and 78. One may see, for example, that after a low energy pulse occurs the image plate in the video camera 21 is scanned during the interval marked 79 and after the high energy x-ray pulse occurs the camera is scanned during the interval marked 80. The vertical retrace time intervals are indicated by the numeral 81. The contents of the memory 37 during the various intervals are indicated in the next to the last line in FIG. 6. In other words, in the particular sequence shown, the memory would first have the data for a frame corresponding to a low energy x-ray pulse followed alternatingly by high and low energy frames. Considering the first two frames, it will be evident that the first one $L_1$ goes into the memory and when the next high energy frame $H_2$ is developed, it goes into the memory and is also transmitted over the live video bus 38 for subtraction in the arithmetic processor as indicated by the bottom line in the timing diagram where $L_1$ which had been in the memory is being subtracted from the live or current video signals $H_2$. The process just repeats alternatingly, that is, low energy frames are repeatedly subtracted from high energy frames but it should be noted that high energy frames have alternatingly a low energy frame which preceded it subtracted from it followed by the same high energy frame having the next low energy frame subtracted from it. This subtraction sequence, that is, 2-1, 2-3, 4-3, 4-5, 6-5, 6-7 etc. results in the same video polarity being maintained on all subtracted images which eliminates the need for inversion. The use of line buffer 44 to reduce timing constraints for reading and writing memory 41 is discussed below.

As mentioned earlier, the FIG. 1 embodiment also provides for operating in the serial imaging mode and the other embodiments provide for this mode too. In this mode, the equivalent of a snapshot of the anatomy, such as the heart or iodinated blood flowing in vessels is taken. Generally a series of snapshots with about 1 second between them would be taken to enable observation of a slowly changing condition, for instance. Each snapshot is comprised of a low x-ray energy frame and a high energy x-ray frame, one of which is subtracted from the other in the arithmetic processor 39 to produce a difference image. If such an image were displayed on the video monitor, it would only last for 1/30th of a second, for instance, and there would be 29/30 of a second intervals when there would be nothing on the display screen. Hence, in accordance with the invention, the pixel data for the snapshot image are fed back to the memory 41 by way of wrap around bus 60 such that the memory 41 can continuously refresh the image on the video display screen for substantially a full second after which a new image would be presented. Hence, having the display screen go blank for most of the time between the serial images is avoided.

Figure 7:
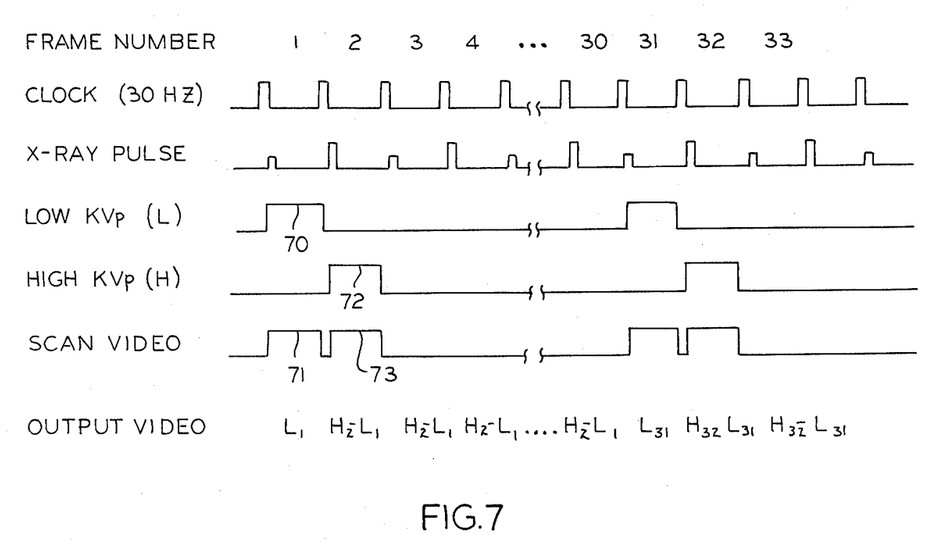
FIG. 7 is a timing diagram for illustrating the serial imaging mode in a system such as the FIG. 1 embodiment.

The timing diagram for performing a serial imaging sequence with the single memory and line buffer system depicted in FIG. 1 is shown in FIG. 7. The top line indicates the frame number under consideration. The 30 Hz clock pulse train is also shown. As previously discussed, a snapshot is comprised of one low x-ray energy frame and one high energy x-ray frame. Thus, for the first snapshot the low energy or low kVp x-ray beam may be provided in the interval marked 70. The camera makes its video scan for the low energy frame during the interval 71 at which time the data for the low energy frame are fed into memory 41. After the next clock pulse, the high energy x-ray pulse occurs during the interval marked 72 and there is concurrent video scanning during the interval marked 73. As indicated at the bottom of the FIG. 7 timing diagrams, after the first frame, the output video consists of the high energy minus the low energy data, that is, $H_2$-$H_1$ continuously for up to thirty frames during which time the snapshot subtracted image is being displayed continuously on the television screen. Then after the thirtieth frame, another pair of low and high energy x-ray exposures are made in quick succession and their data are subtracted and maintained for another thirty frames.

The depicted FIG. 1 system uses one full frame memory 41 and a line buffer 44. The use of a line buffer helps to avoid some timing constraints imposed by the read and write time limitations of the memory. In the described system, one line of the memory is addressed for reading while the previous line is addressed for writing. During a single frame time, each line of the memory is addressed once for reading and once for writing, and the read/write status changes every line time. By using the fastest memories which are now available, the buffer can be eliminated. In a single memory system with no line buffer, one pixel in memory rather than one line is addressed for reading while a previous pixel within the same line is addressed for writing, and the read/write status changes every pixel time rather than every line as in the previously described case. The latest state of the art fast access memory devices have read-before-write capability so data transfer can be realized with just a single memory. Having the incoming pixel data overriding or erasing the pixel data stored from a previous frame is avoided. Typically, the presently available fastest memories can change from read to write addressing in approximately 100 nanoseconds so they are compatible with a standard 60 Hz video system.

Figure 2:
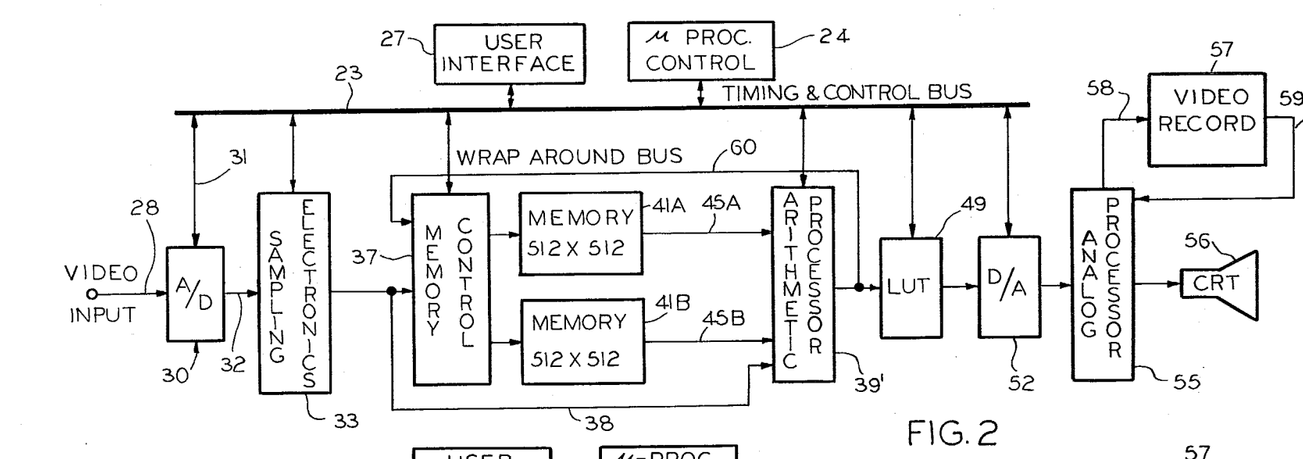
FIG. 2 is a block diagram of an alternate embodiment of the signal processing and display system using two memories to provide the capabilities of the preceding embodiment.

Another embodiment of the digital image subtraction system is shown in FIG. 2. In this embodiment, components which function similarly to their counterparts in FIG. 1 are given the same reference numerals. In FIG. 2, two full frame memories are used. The counterpart for full frame memory 41 is given the reference number 41A in FIG. 2 and the second memory is given the numeral 41B. The FIG. 2 embodiment eliminates the need for using the line buffer 44 which was used in the FIG. 1 embodiment. Relatively slow read/write cycle memories can be used to obtain the read-before-write capability that is obtained by using one memory and a buffer as was done in FIG. 1. The FIG. 2 embodiment also has continuous and serial imaging capabilities.

In FIG. 2 the analog video signals for the consecutive low and high x-ray energy frame pairs are input by way of line 28 to the A/D converter 30 as in the previously discussed embodiment. The digitized data for the high and low energy frames are alternated between memories 41A and 41B. By way of illustration, assume that the first frame resulted from a high energy x-ray pulse. Its digitized pixel data would be addressed to memory 41A. The data for the quickly following low energy frame will be addressed to memory 41B. Concurrently with the data for the low energy frame being fed into memory 41B, the same live video data are being transmitted over bus 38 to one input of the arithmetic processor 39. As this occurs, the high energy pixel data are output on a line-by-line basis from memory 41A in-phase with the low energy live frame data on bus 38. Thus, the contents of the memory 41A are fed by way of bus 45A to the arithmetic processor concurrently with the data on bus 38 so that the high energy data can be subtracted in-phase from the low energy data. When the next high energy frame is generated, its data are again fed into memory 41A and are concurrently carried on bus 38 as one input to the arithmetic processor.

During this time, the low energy frame data are fed out from memory 41B in-phase with the high energy data on bus 38 and subtraction of these two data is performed in the processor 39. The process just repeats for each high and low energy frame. That is, the high energy frame data always goes into memory 41A for being combined with the low energy data on bus 38. The low energy frame data always goes into memory 41B for being combined with the high energy frame data on bus 38. It will be evident that avoiding the need for getting one line of data out of the memory and into a buffer so that it is not overwritten, which is a possibility unless timing is very precise in the FIG. 1 embodiment, is relieved in the FIG. 2 two memory system. In the FIG. 2 embodiment, it is only necessary to switch or address the memory between read and write status during the retrace time. The difference image data will be output from arithmetic processor 39' and will go through the LUT 49, D/A converter 52 and analog processor 55 components for display on the television monitor CRT 56 as a continuous or realtime image as in the FIG. 1 embodiment.

For snapshot or serial imaging in the FIG. 2 embodiment, the data for one difference image are generated and fed back from the output of processor 39' by way of a wrap around bus 60 to one of the memories such as 41B. When the next snapshot comprised of a low and high x-ray energy pair of frames is made, usually about one second after the first one, the data for the high energy frame are addressed to memory 41A. The data for the low energy frame in the pair of subtraction frames are then fed over bus 38 for being subtracted in-phase from the high energy data output from memory 41A.

Of course, each time image data resulting from subtraction occurs, it will be output from processor 39 and operated on by the LUT 49 before it is converted to analog video waveforms by converter 52.

Figure 9:
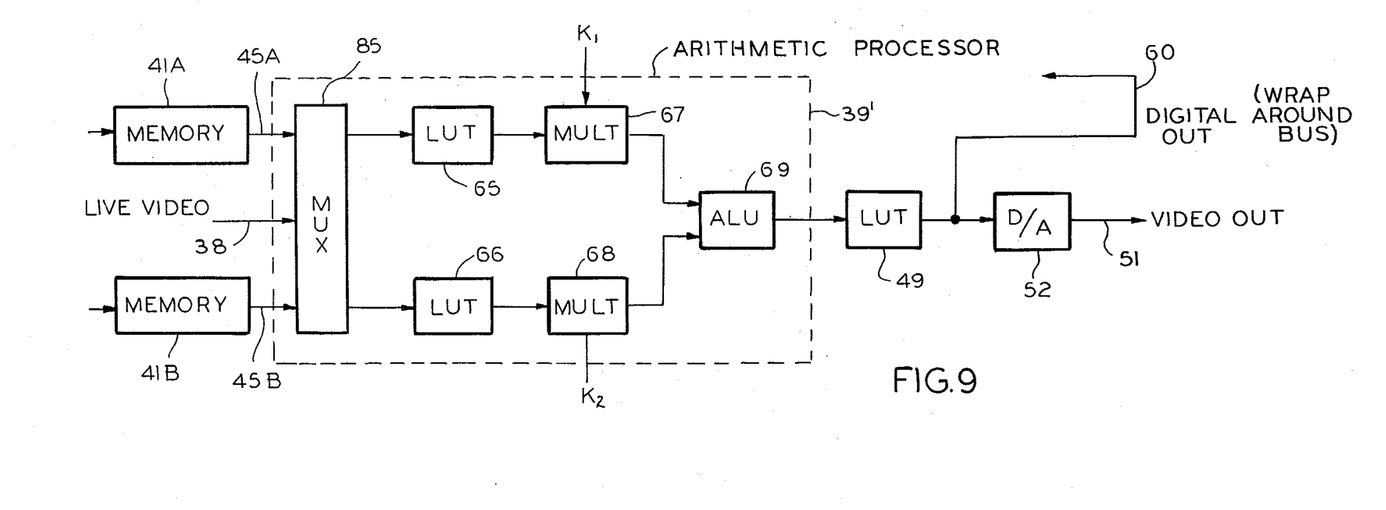
FIG. 9 includes a block diagram of a typical arithmetic processor for use in the FIG. 2 embodiment to obtain serial or continuous subtraction images.

The arithmetic processor used in the FIG. 2 embodiment is somewhat different than that used in the FIG. 1 embodiment and is given the reference numeral 39'. The processor is shown in FIG. 9. This processor uses a multiplexer represented by the block marked 85. It has the three inputs, one each from memories 41A and 41B and one consisting of the live video input 38. The multiplexer outputs to alternate look-up tables, LUTs 65 and 66, which are loaded with logarithmetic transformation data and would be present if amplifier 26 in FIG. 1 were a linear amplifier rather than a logarithmic amplifier. In FIG. 8, the data from memory 41A are multiplexed to LUT 65 concurrently with the data on the live video bus 38 being multiplexed to LUT 66 so that these data can be transformed logarithmically before entering ALU 69 for subtraction. Conversely, the data from memory 41B are directed to LUT 66 and the live video data then on bus 38 are directed to LUT 65 to thereby avoid confusion of the data prior to subtraction. As in the FIG. 8 processor used with the FIG. 1 embodiment, the processor 39' in FIG. 9 also uses multipliers 67 and 68 that allow for weighting the data by means of multiplying factors $K_1$ and $K_2$, respectively. After subtraction in ALU 69, the frame difference digital data is fed into LUT 49, as been previously explained, for being adjusted to fill the full dynamic range of the ensuing digital-to-analog converter. The analog video output line 54 and the digital wraparound bus 60 are also shown in FIG. 9.

Figure 3:
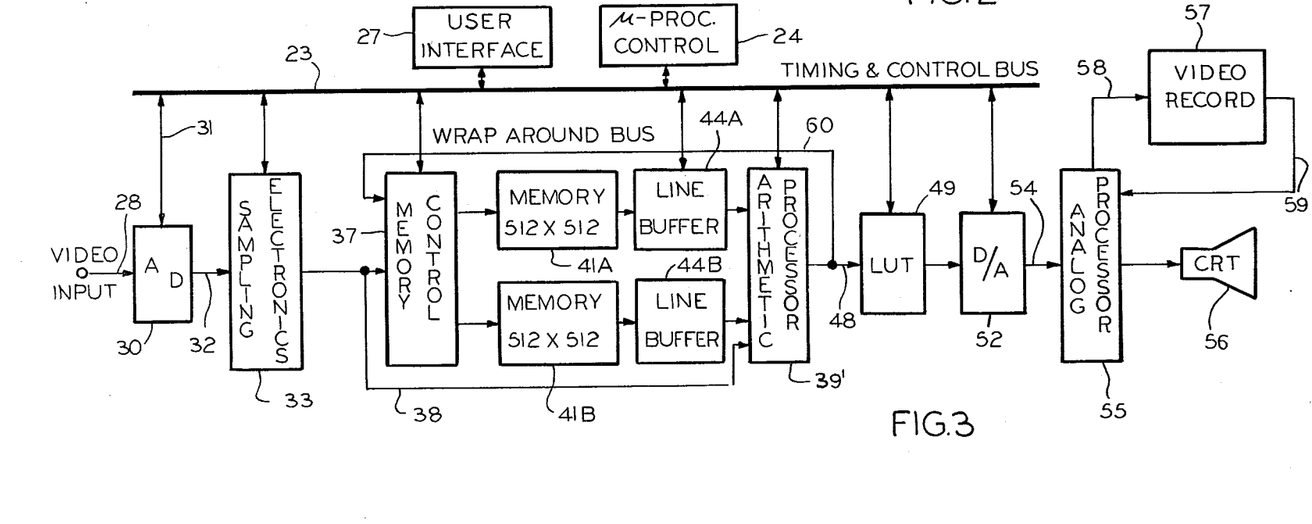
FIG. 3 is a block diagram of another embodiment of a dual x-ray energy signal processing system wherein two memories and two buffers are used to provide a capability for displaying integrated subtracted x-ray images in addition to continuous and serial images.

The FIG. 3 embodiment of the image subtraction system has the capability of doing everything that can be done with the FIG. 1 and 2 embodiments. In addition, FIG. 3 permits integration of images. It is possible that the images formed with an x-ray generator of limited beam intensity would be noisy if they were presented on a frame-by-frame basis in the continuous mode. Noise, evidenced as a mottled image on the display screen, results from the x-ray photons being emitted from the x-ray tube and absorbed by the image intensifier tube at a random rather than at a constant rate. Integration of the data for several subtraction images helps to reduce noise by averaging it over the several frames. The block diagram of the FIG. 3 system is similar to that of FIG. 2 except that there are one-line buffers 44A and 44B interposed between the two memories 41A and 41B, respectively, and the arithmetic processor 39.

The operation of memory 41B, buffer 44B and the live video bus 38 will be considered first. In reality, these components operate in the same manner as they do in the FIG. 1 embodiment. They are used, however, to integrate data for several successive subtraction image frames. The integrated image data are stored during the integration interval in the other memory 41A and then sent out through the arithmetic processor for effecting display on the monitor. By way of example, typically two sets of difference data would be integrated before the final result is displayed. Thus, the image would be changing on the display screen every 2/15ths of a second and if there is movement in the body through which the x-ray beam passes a little more image smearing would be noticeable. However, the image on the display screen would appear to be more homogeneous and, therefore, easier for the observer to view and derive information from it.

In the FIG. 3 embodiment, the difference data or data resulting from subtraction are produced as in FIG. 1. That is, the high and low x-ray energy image data alternate between memory 41B and live video bus 38. To recapitulate briefly, assume that the first frame in a pair of frames results from a high energy x-ray pulse. The digitized data for this frame would be inserted in memory 41B. During the video camera vertical retrace time, the first line of the stored image would be transferred to one-line buffer 44B to make room for the next incoming data for the following high x-ray energy frame. When the low energy frame data are developed, they are input into memory 41B and are concurrently transmitted over live video bus 38 in phase with the output of the buffer 41B to the arithmetic processor where each line from each frame is subtracted. The lines of pixel data following the first line are, of course, moved into the buffer 44B one after another so they will remain in-phase with the lines of data being transmitted over the live video bus 38. The high energy data and low energy data for succeeding frames alternate between memory 44B and live video bus 38. As in the FIG. 1 embodiment, the FIG. 3 embodiment brings about subtraction of the successive pairs of low and high energy images. In the FIG. 3 embodiment, however, the difference image data are fed back through the wrap around bus 60 to memory 41A for integration. The integrating mode of operation for the FIG. 3 embodiment and subsequent embodiments can be described most conveniently in reference to the FIG. 10 timing diagram.

Figure 10:
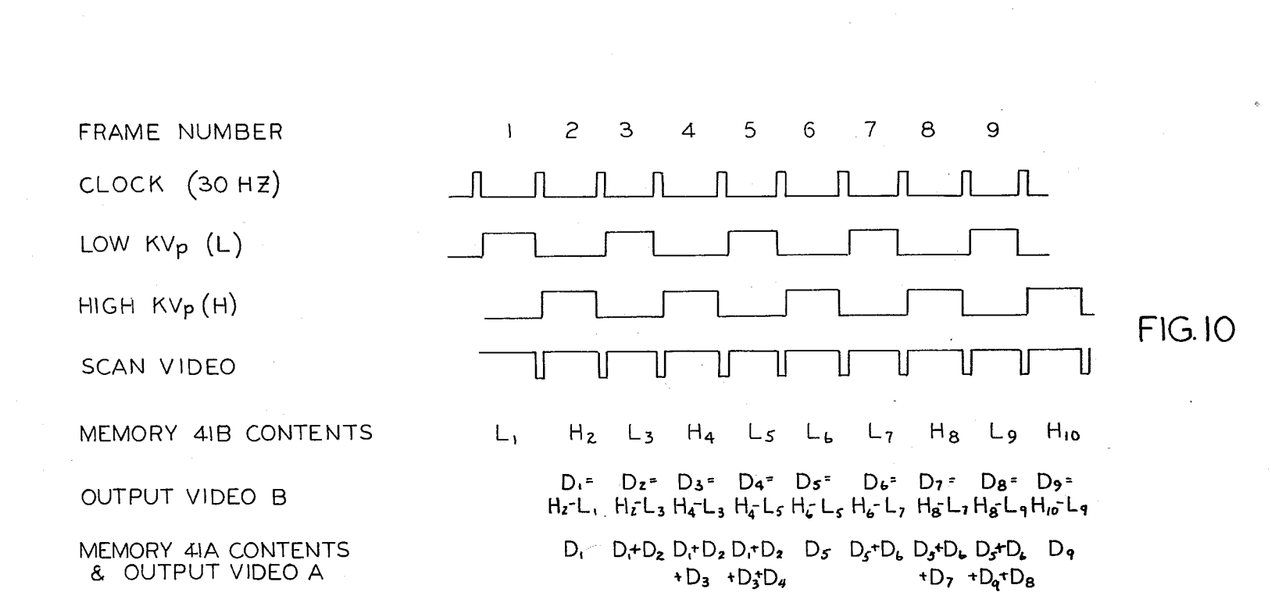
FIG. 10 is a timing diagram for illustrating continuous imaging, serial imaging and integration modes in connection with an embodiment such as in FIG. 4 or 5.

In FIG. 10, the video frame number under consideration, the clock pulse train, low and high energy pulse sequences and the video scanning sequence are labelled. Their relationship is self-evident. The contents of memory 41B are shown to alternate to accept a low energy frame data $L_1$ followed by high energy data $H_2$ and then $L_3$, $H_4$, $L_5$, $H_6$ and so on. The second line from the bottom in the FIG. 10 timing diagrams, labelled output video B, shows what the output video is from processor 39' as a result of subtractions. D indicates the difference data and what has been subtracted is indicated on the right side of the equal sign. For instance, the first difference data results from subtracting the first low energy frame $L_1$ from the next ensuing high energy frame $H_2$. The next difference data $D_2$ results from subtraction of $L_3$ from $H_2$. As can be seen, sets of difference data $D_3$ and so on continue to be produced.

When the first subtraction is made, that is when $L_1$ is subtracted from $H_2$, the result, $D_1$, is delivered through the wrap around bus 60 to memory 41A which becomes filled with the difference data. When the next set of difference data is determined by taking the difference between the contents of memory 41B and live video on bus 38, this difference, $D_2$, is added to $D_1$ in the arithmetic processor and delivered to the integrating memory 41A. The integration results from the fact that $D_2$ becomes available by action of memory 41B, line buffer 44B and bus 38 and $D_1$ is already available from memory 41A. Thus, when the low energy data $L_3$ becomes available $D_2$ can be added to $D_1$ and the result returned to memory 41A. When $H_4$ occurs, memory 41B, line buffer 44B and bus 38 provide inputs to the processor 39' for permitting subtraction of $L_3$ from $H_4$ to produce difference data $D_3$. The integrating memory 41A contents are, of course, output through buffer 44A concurrently with development of $D_3$ so that, by way of wrap around bus 60, the contents of integrating memory 41A become $D_1+D_2+D_3$. Next $D_4$ is produced as is evident from the FIG. 10 timing diagram. This difference data produced by cooperation of memory 41B and live video line 38 is then again combined with the data from the integrating memory 41A such that it now contains differences $D_1+D_2+D_3+D_4$ and four frames of difference data have been integrated. The system is now timed so that the integrated frame data can be put through the LUT 49 and the D/A converter 52 for conversion to analog video waveforms that permit integrated image display. As can be seen in FIG. 10, the integration cycle just repeats over and over again. It should be evident that the FIG. 3 embodiment not only has the continuous imaging integration capability but also has continuous imaging or real-time capability and serial imaging capability as well by operating the system in the modes which has been previously described in reference to FIGS. 1 and 2.

It will be evident that the FIG. 3 embodiment permits switching between continuous or real-time imaging, continuous imaging with integration or serial imaging, but no two of these modes can be performed at the same time. The more sophisticated FIG. 4 embodiment, however, permits all the modes to be performed and allows display of any two types of images at the same time. In the FIG. 4 embodiment, everything is the same as in the FIG. 3 embodiment up to the output of the arithmetic processor 39''. The processor will be described later in reference to FIG. 11. It is constructed somewhat differently than the processors which were previously discussed.

Figure 4:
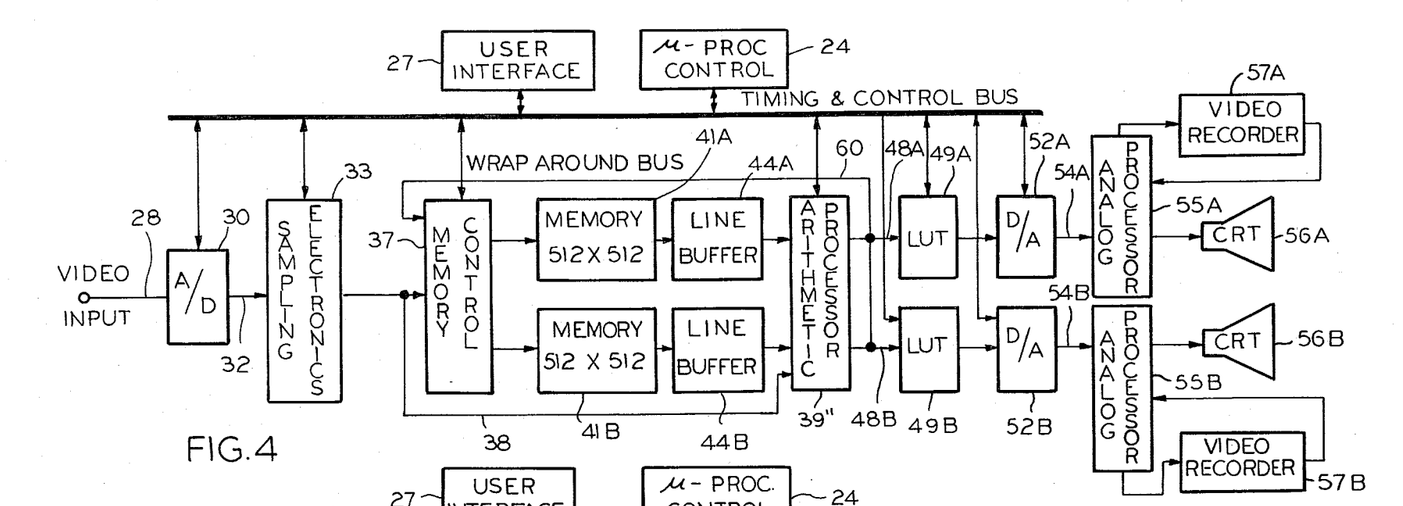
FIG. 4 is a block diagram of an alternative embodiment of the signal processing system using two memories and two buffers together with additional components to provide a capability for displaying either integrated or serial subtraction images concurrently with continuous dynamic images.

In FIG. 4, memory 41B, line buffer 44B and live video bus 38 simulate the FIG. 1 embodiment and are used to produce the difference data for providing continuous or real-time images of moving or stationary anatomy. The difference data for continuous images would be output on bus 48B to the LUT 49B which performs as does its counterpart 49 in the preceding embodiments. Here again, the digital difference data from the LUT 49B are converted to analog waveforms in converter 52B. The analog video signals are suitably processed in processor 55B to facilitate display of the continuous image on the screen of CRT 56. The analog video signals may also be recorded and made available for image playback with the video recorder 57B. Integrated imaging and serial imaging have already been described in connection with the FIG. 3 embodiment. These functions involve use of memory 41A, buffer 44A and the wraparound bus 60 as has been described. The serial frame pair data and the integrated frame data are output from the digital processor by way of bus 48A to LUT 49A in FIG. 4. The function of the LUT 49A has already been described. The output data from the LUT for one or the other of a serial image sequence or an integrated image sequence are fed to D/A converter 52A and become input on bus 54A to analog video signal processor 55A. Thus, one or the other of a serial imaging sequence or an integrated imaging sequence can be displayed on the screen of CRT 56A concurrently with the continuous image being displayed on the screen of CRT 56B. The user selects between the serial or integrating mode by using the keyboard of the user interface 27 for providing information to the microprocessor control 24 which, in turn, puts out the proper signals on timing and control bus 23 for causing the system to operate in one or the other modes.

Figure 11:
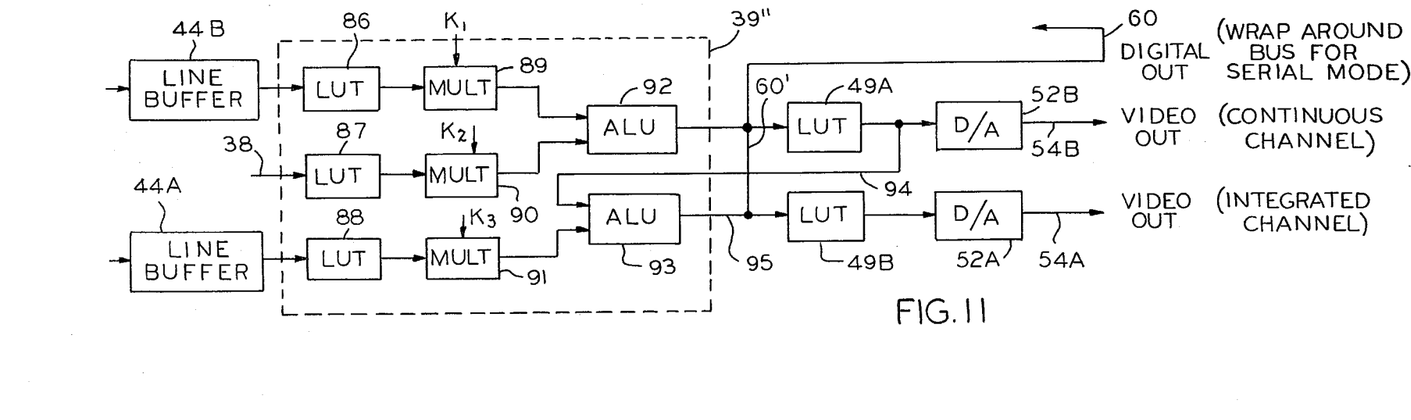
FIG. 11 includes a block diagram of a typical arithmetic processor for use in the FIGS. 4 and 5 embodiments to obtain dynamic or continuous real-time imaging, continuous imaging with integration and serial imaging.

The arithmetic processor 39'' block diagram for the FIG. 4 embodiment is shown in FIG. 11 where it is contained in the dashed line rectangle marked 39''. In this processor, three LUT's can be used for logarithmic transformation and they are marked 86, 87 and 88. Three multipliers 89, 90 and 91 are used to effect weighting of the various low and high energy frame data. There are also two arithmetic logic units 92 and 93. A part of the wrap around bus 60 is also shown. As previously alluded to, for integration the differences between several low and high energy frame pairs are fed back by way of the wrap around bus 60 and 60' to memory 41A. As can be seen in FIG. 11, the difference data are produced with the data input to the processor from buffer 44B and live video bus 38. After going through the LUTs and multipliers in succession, the data for the low and high energy frames are subtracted in ALU 92 and fed to LUT 49A. In FIG. 11, the output of LUT 49A is coupled by means of a bus 94 to an input of the other ALU 93. The other input to ALU 93 comes from the line buffer 44A. Thus, ALU 93 combines the information resulting from integration in memory 41A, after it is fed through line buffer 44A, with the difference data derived from the output of LUT 49A. The total integrated data, that is, after four frames for example, are output from ALU 93 on a bus 95 to LUT 49B. The digital output from LUT 49B is input to D/A converter 52A and its output is the analog video signal which drives CRT 56A in FIG. 4 for the integrated and serial mode.

In FIG. 11, the output of ALU 92 constitutes the difference data resulting from subtraction of a pair of low and high energy frames. These difference data are fed directly to LUT 49A and converted in D/A converter 52B to analog processor 55B for driving CRT 56B in the continuous mode.

Referring to FIG. 11, when the serial mode is in progress, only the inputs to ALU 92 are involved and the output from ALU 92 is simply fed back to the memory 41A by way of wrap around bus 60.

Figure 5:
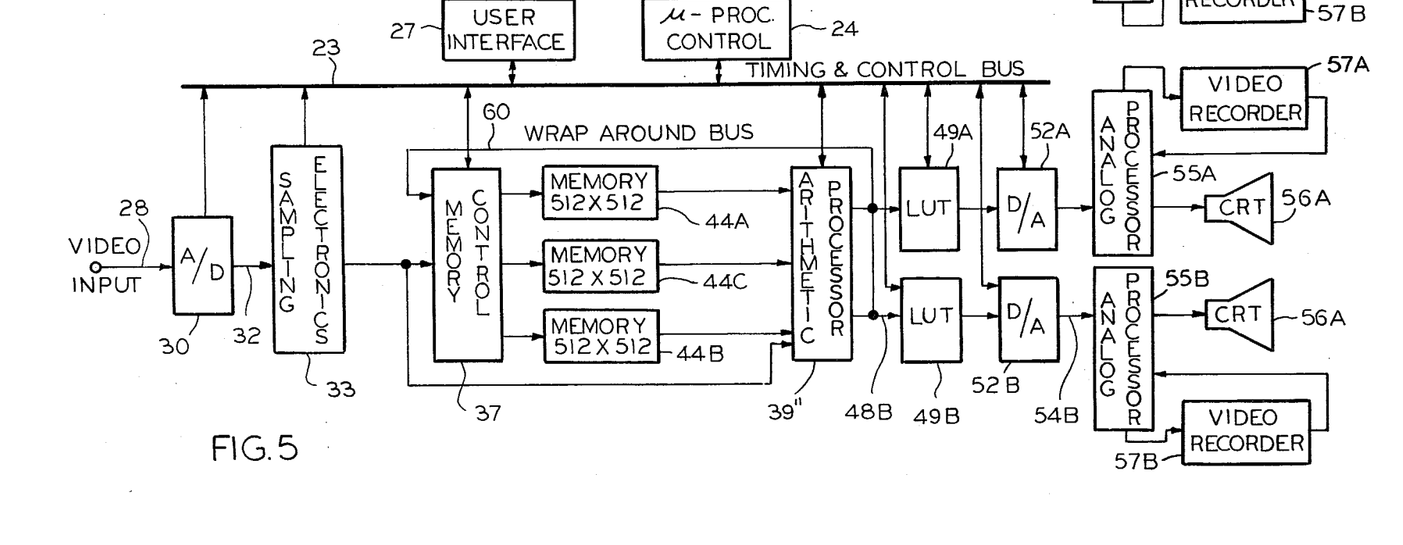
FIG. 5 is a block diagram of another alternative embodiment which employs three memories and not buffers to provide all of the capabilities of the FIG. 4 embodiment.

The FIG. 5 embodiment removes some of the timing constraints that are inherent with the use of two memories and two line buffers as was done in the FIG. 4 embodiment. The timing constraints are mitigated by using three memories 44A, 44B and with 44C being the third memory. The video input 32, A/D converter 30, the sampling electronics 33, the live video bus 38 and the wrap around bus 60 are the same as in the FIG. 4 embodiment and need not be discussed again. The memory control 37 is structurally the same but it is programmed for different timing functions.

The FIG. 5 embodiment has three operating modes: continuous imaging, continuous imaging with integration, and serial imaging. This system also permits viewing integrated images concurrently with a continuous image. Continuous imaging will be discussed first.

In FIG. 5, memories 44B and 44C are used for continuous imaging in conjunction with live video bus 38. For continuous imaging, one of these memories is addressed for reading and the other memory is addressed for writing during a single frame time in order to achieve the read-before-write requirement. For example, the data corresponding to a high energy x-ray image may be input to memory 44B. When a low energy x-ray pulse occurs, it constitutes live digitized video which is transmitted over bus 38. The pixel data in memory 44B are then read out in-phase and on a line-by-line basis with the data on live video bus 38. The data from the memory and on the live video bus are combined or subtracted in arithmetic processor 39". While the data for the low energy x-ray image are being transmitted over bus 38, they are also being stored in memory 44C. Now when the data for the next high energy x-ray image are developed, they are simultaneously transmitted over live video bus 38 and subtracted or combined in-phase with the low energy image data from memory 44C in the arithmetic processor 39". When the next high energy image data are developed, they are transmitted over live video bus 38 and simultaneously subtracted or combined with the low energy data which are now being read out in-phase from memory 44C by the arithmetic processor. When the next high energy x-ray pulse occurs, its corresponding pixel data are stored in memory 44B until the data for another low energy frame are transmitted over bus 38 to permit in-phase subtraction or combination with the pixel data in memory 44B. It will be evident that the data for a low energy image will always be addressed to memory 44C and the data for a high energy image will always be addressed to memory 44C and the data for a high energy image will always be addressed to memory 44B so that alternate subtraction of the data in these memories from the data on bus 38 can be done in sequence, that is, each memory can be read out completely before further data is written into it.

The data for the difference images are processed in a fashion similar to what was done in the previous embodiments. That is, the difference data are output from arithmetic processor 39" and input to LUT 49B where they are expanded to the full scale of the ensuing D/A converter 52B. The analog video output on bus 54B is sent to the analog processor which controls the CRT display 56B and also provides the analog video signals to the video recorder 57B at the option of the user.

For operating in the integration mode, the difference data for a plurality of frames, such as four frames, is delivered by way of bus 60' and wrap around bus 60 to the memory control and then to memory 44A. When four or whatever number of frames desired are integrated, the digital frame data from memory 44A are read out by the arithmetic processor and sent through LUT 49A and converted to analog video signals in D/A converter 52A for use by the analog processor 55A in bringing about display of the integrated subtraction image on the screen of CRT 56A.

In the serial or snapshot imaging mode, the data for a high and low energy image are subtracted by the arithmetic processor 39" as in continuous or integrated imaging. For the first snapshot in a sequence, the data in memory 44B and the data of opposite energy on bus 38 are subtracted. For the next snapshot in the series, the data in memory 44C are subtracted or combined with the data or opposite energy on bus 38. When, for example, the first difference image data are yielded by the arithmetic processor 39" they are transmitted by way of bus 60' and wrap around bus 60 to a memory 44A where they are held for the major part of a second to enable continuous display of the image on the CRT 56A screen during the times between successive snapshots. The serial mode of operation in FIG. 5 is comparable to that which has been described in connection with FIG. 4 except that the line buffer 44A which is present in the FIG. 4 embodiment is eliminated in the FIG. 5 embodiment since the read-before-write requirement has been achieved by using the third memory 44A.

Although various embodiments of the invention have been described, the true scope of the invention is to be determined by interpretation of the claims which follow.

We claim:

1. A method of producing visible images by integrating difference images that are obtained by subtracting images acquired in pairs that result from exposing a subject to alternate low and high energy x-ray beams including the steps of:

projecting an x-ray beam having one energy and an x-ray beam having another energy through a subject in quick succession to produce a sequential pair of x-ray images, converting the x-ray images in sequence to television frames comprised of lines of analog video signals, converting said analog video signals to digital pixel signals each representing a picture element in an image frame, storing the digital pixel signals for a frame at one energy in one digital memory and transferring the pixel signals out of said one memory in phase with corresponding digital pixel signals for the succeeding current frame at the other energy while simultaneously storing the pixel signals for the current frame in another memory and concurrently combining the pixel signals for the stored and current frames to yield difference digital pixel signals for a frame representative of the difference between the consecutive x-ray images, next transferring the digital pixel signals for the frame at said other energy out of the second memory in phase with corresponding digital pixel signals for the current frame at the one energy while simultaneously storing the signals for the last-mentioned current frame at the one energy in the one memory and concurrently combining the pixel signals for the stored and current frames to yield difference digital pixel signals for a frame representative of the difference between the consecutive low and high energy x-ray images, feeding the difference digital pixel signals for the first subtracted image in a series to be integrated to a third digital memory as the difference image signals are produced, transferring the digital pixel signals out of said third memory for being combined with corresponding difference digital signals for the next frame and feeding back the combined signals to the locations in the third memory out of which corresponding difference digital pixel signals were transferred, and then converting the integrated digital pixel signals in the third memory to analog video signals for displaying the integrated difference image.

2. A method of producing visible images representative of the difference between a pair or a succession of pairs of x-ray images and for displaying the difference images in the continuous imaging mode and optionally in one or the other of the serial and integration modes, comprising the steps of:

projecting an x-ray beam having one energy and an x-ray beam having another energy through a subject in quick succession to produce a sequential pair of x-ray images, converting the x-ray images in sequence to television frames comprised of lines of analog video signals, converting said analog video signals to digital pixel signals each representing a picture element in an image frame, for the continuous imaging mode repeatedly storing the digital pixel signals for a frame at one energy in a first digital memory and following completion of said storage transferring a first line and succeeding lines of stored pixel signals to a buffer and transferring the pixel signals for said lines successively out of said buffer in phase with corresponding pixel signals for the succeeding current image frame at the other energy and concurrently feeding the pixel signals for the other energy image into said memory in place of the signals for the preceding frame and continuously combining the digital pixel signals for the preceding frame as they are transferred out of the buffer in phase with corresponding digital pixel signals for the current frame to yield difference digital pixel signals for a frame representative of the difference between the consecutive x-ray images in each pair, using a look-up table to adjust the amplification and offset of the difference digital pixel signals representative of the continuous mode difference images thus produced to the bit range of a first digital-to-analog converter, then using said first digital-to-analog converter to convert said successively produced difference digital pixel signals to analog video signals, and using said analog video signals to control a first television monitor to display the successive difference images, and for imaging in said serial mode, storing any selected one of the difference digital signals for a frame in a second memory for a selected interval, using a second look-up table to adjust the amplification and offset of the selected and stored difference digital pixel signals to the bit range of a second digital-to-analog converter, then using said second digital-to-analog converter to convert said selected difference digital pixel signals for the frame to convert said signals to analog video signals, and using said analog video signals to control a second television monitor to display the selected image continuously for the duration of said interval or until other difference digital signals for a frame are selected and replace the signals previously stored in said second memory, and for imaging in said integration mode alternatively to said serial mode, feeding said difference digital pixel signals for a predetermined number of image frames to be integrated to said second digital memory as the signals are produced, and when said number are integrated in said memory using said second look-up table to alter the amplification and offset of the difference digital pixel signals representative of the integrated difference image frame to the available bit range of said second digital-to-analog converter, then using said second digital-to-analog converter to convert the integrated image frame digital pixel signals to analog video signals for controlling said second television monitor to display the image.

3. Apparatus for producing visible images representative of the difference between x-ray images comprising:

an x-ray source and means for controlling said source to project x-ray beams having different energies consecutively through a subject, means including video camera means for converting the images produced by the beams to lines of analog video signals composing the frames corresponding to the successive different energy images, respectively, analog-to-digital converter means for converting the analog video signals for the different energy frames in succession to lines of digital pixel signals corresponding to the picture elements in the respective images, processor means including a digital signal output, a plurality of digital signal inputs and means for subtracting digital signals, bus means for coupling the digital pixel signals for the current image frame directly to an input of said processor means, first and second digital memories each having sufficient capacity to store at least the digital signals representative of a single image frame, said memories having input and output means, first and second buffers for coupling the output means of the respective memories to inputs of said processor means, a wrap around bus for feedback of the digital signals for difference images from the output of said processor means to the input means of the memories, control means for controlling said apparatus to operate in a selected mode including a continuous difference imaging mode, a serial difference imaging mode and an integrated difference imaging mode, for said continuous difference imaging mode said control means causing the lines of digital pixel signals for a preceding image at one energy to be written into one memory and to transfer the first line of signals to its associated buffer during the retrace time of said video camera means and then to transfer following lines of pixel signals in sequence to said buffer so they are input to said processor means in phase with corresponding digital pixel signals resulting from the current image frame at the other energy on said bus means, for said processor means to subtract the pixel signals for the different energy images and provide on its output means lines of digital difference pixel signals, digital-to-analog converter means and means for coupling said difference signals from said processor to said converter, said converter being operative to convert said digital difference signals to analog video signals, and television means responsive to the last-named analog video signals by displaying visible images representative of the difference between the x-ray images at the different energies, said images being displayed at the rate at which pairs of different energy x-ray images are produced, and for said integrated imaging mode said control means causing said difference image signals from said processor to be fed back to the other of said memories and for the first line of said digital difference signals to the buffer associated with said other memory during said retrace time, said difference signals produced by said processor by adding the pixel signals for the different energy frames being combined with the signals stored in said other memory and fed back from said processor to said other memory for a predetermined number of frames to effect said integration and then said pixel signals from said other memory being coupled to said digital-to-analog converter to effect display of the integrated difference image.

4. The apparatus set forth in claim 3 including:

another digital-to-analog converter means and means coupling the output means of said processor to said other digital-to-analog converter and it being operative to convert digital pixel signals to analog video signals, said control means being operative to cause the digital pixel signals for a selected one of said serial or integrated difference images to be input to said other digital-to-analog converter, another television means responsive to analog signals from said other converter by displaying visible images corresponding to the serial or integrated image selected.

5. Apparatus for producing visible images representative of the difference between x-ray images comprising:

an x-ray source and means for controlling said source to project x-ray beams having different energies consecutively through a subject, means including video camera means for converting the images produced by the beams to lines of analog video signals composing the frames corresponding to the successive different energy frames, respectively, analog-to-digital converter means for converting the analog video signals for the different energy frames in succession to lines of digital pixel signals corresponding to the picture elements in the respective images, processor means including a digital signal output, a plurality of digital signal inputs and means for subtracting digital signals, bus means for coupling the digital pixel signals for the current image frame directly to an input of said processor means, first and second digital memories each having sufficient capacity to store at least the digital signals representative of a single image frame, said memories having input and output means, first and second buffers for coupling the output means of the respective memories to inputs of said processor means, a wrap around bus for feedback of the digital signals for difference images from the output of said processor means to the input means of the memories, control means for controlling said apparatus to operate in a selected mode including a continuous difference imaging mode, a serial difference imaging mode and an integrated difference imaging mode, for said continuous difference imaging mode said control means causing the lines of digital pixel signals for a preceding image at one energy to be written into one memory and to transfer the first line of signals to its associated buffer during the retrace time of said video camera means and then to transfer following lines of pixel signals in sequence to said buffer so they are input to said processor means in phase with corresponding digital pixel signals resulting from the current image frame at the other energy on said bus means, for said processor means to subtract the pixel signals for the different energy images and provide on its output means lines of digital difference pixel signals, digital-to-analog converter means and means for coupling said difference signals from said processor to said converter, said converter being operative to convert said digital difference signals to analog video signals, and television means responsive to the last-named analog video signals by displaying visible images representative of the difference between x-ray images at the different energies, said images being displayed at the rate at which pairs of different energy x-ray images are produced, for said integrated imaging mode said control means causing said difference image signals from said processor to be fed back to the other of said memories and for the first line of said digital difference signals to the buffer associated with said other memory during said retrace time, said difference signals produced by said processor by adding the pixel signals for the different energy frames being combined with the signals stored in said other memory and fed back from said processor to said other memory for a predetermined number of frames to effect said integration and then said pixel signals from said other memory being coupled to said digital-to-analog converter to effect display of the integrated difference image, and including look-up table means having input means coupled to the output means of the processor and output means coupled to said digital-to-analog converter, said look-up table means being operative to adjust the difference digital pixel signals from the processor to fill the dynamic range of the converter and to correct for negative values in the difference image signals.

6. Apparatus for producing visible images representative of the difference between x-ray images comprising:

an x-ray source and means for controlling said source to project x-ray beams having different energies consecutively through a subject, means including video camera means for converting the images produced by the beams to lines of analog video signals composing the frames corresponding to the successive different energy images, respectively, analog-to-digital converter means for converting the analog video signals for the different energy frames in succession to lines of digital pixel signals corresponding to the picture elements in the respective images, processor means including a digital signal output means, a plurality of digital signal inputs and means for subtracting digital signals, bus means for coupling the digital pixel signals for the current image frame directly to an input of said processor means, first, second and third digital memories each having the capacity to store at least the digital signals representative of a single image frame, said memories having input and output means, the respective output means being coupled to the inputs of the processor, a wrap around bus for feedback of digital difference image signals from the output means of the processor to the input means of the first memory, control means operative to cause the lines of digital pixel signals for an image at the higher of the energies to be cyclically written into one of the memories and to be read out in phase with the digital pixel signals on said bus means for an ensuing image at the lower of the energies while said signals for the lower energy image are also being written into the second memory, and to cause the digital pixel signals for the next ensuing higher energy image to be written into said first memory again while said signals for the preceding lower energy image in said second memory are read out in phase with the signals for the said next ensuing higher energy image on said bus means, the in-phase pairs of signals comprised of signals read out from a first or second memory and signals supplied on said bus means being subtracted in said processor means to provide digital difference signals to the output means of the processor representative of the difference between images corresponding with a successive pair of different energy x-ray images, first digital-to-analog converter means having input and output means and means for coupling said difference signals from the output means of the processor to the input means of the converter, said converter means being operative to convert said digital difference image signals to analog video difference signals, and television means responsive to said analog difference signals by displaying visible images representative of the difference between the x-ray images at the different energies at the rate of which pairs of different energy images are produced, said control means being operable to effect display of a series of images spaced apart in time by causing said digital difference signals for a difference image frame to be transmitted by way of said wrap around bus to said input means of the third digital memory for storage therein for a predetermined interval, another digital-to-analog converter means having input and output means and means for coupling said digital difference image signals from said third memory means to the input of said other converter means, said converter means being operative to convert said signals to analog video difference signals, another television means responsive to said last-named analog signals by displaying a visible image representative of the difference between the x-ray images at the different energies for whose signals were stored in said third memory, said image being displayable until the difference image signals corresponding to another pair of x-ray images at the different energies is stored in said third memory for being displayed.

7. The apparatus set forth in claim 6 wherein said control means is operable to effect display integrated difference images by causing the digital difference signals for the first in a succession of frames to be coupled from the output means of said processor to the input means of said third memory for storage therein, said control means being further operable to cause said processor means to combine the digital difference signals for additional frames cyclically during a predetermined interval with corresponding digital difference signals accumulated in said third memory and to feed back said combined signals from the output means of said processor to the input means of said third memory to thereby enable display on said other display means of an integrated difference image at the end of said interval.

8. The apparatus set forth in any of claims 6 or 7 wherein the respective means for coupling the output means of said processor means to the input means of a digital-to-analog converter includes look-up table means for adjusting the digital pixel signals to fill the dynamic range of the converter.

* * * * *